United States Patent
Tang et al.

(10) Patent No.: US 11,159,208 B1
(45) Date of Patent: Oct. 26, 2021

(54) OPTIMAL PRECODER METHOD AND APPARATUS WITH EQUAL POWER ALLOCATION

(71) Applicant: Samsung Electronics Co., Ltd., Gyeonggi-do (KR)

(72) Inventors: Yanru Tang, San Diego, CA (US); Hongbing Cheng, San Diego, CA (US); Qi Zhan, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/030,904

(22) Filed: Sep. 24, 2020

Related U.S. Application Data (60) Provisional application No. 63/052,205, filed on Jul. 15, 2020.

(51) Int. Cl.
*H04L 5/12* (2006.01)
*H04L 23/02* (2006.01)
*H04B 7/0426* (2017.01)
*H04B 7/0456* (2017.01)

(52) U.S. Cl.
CPC ......... *H04B 7/0443* (2013.01); *H04B 7/0465* (2013.01); *H04B 7/0482* (2013.01)

(58) Field of Classification Search
CPC ... H04B 7/0443; H04B 7/0465; H04B 7/0482
USPC ...................................................... 375/262
See application file for complete search history.

(56) References Cited

U.S. PATENT DOCUMENTS

| | | | |
|---|---|---|---|
| 7,577,209 B2 | 8/2009 | Poon | |
| 9,271,246 B2 | 2/2016 | Liu | |
| 9,319,252 B2 | 4/2016 | Li et al. | |
| 2006/0039497 A1 | 2/2006 | Vu et al. | |
| 2008/0112504 A1* | 5/2008 | Jiang .................... | H04L 1/0618 375/296 |
| 2008/0279142 A1 | 11/2008 | Kim et al. | |
| 2009/0046800 A1* | 2/2009 | Xu ........................ | H04L 1/0001 375/267 |
| 2011/0058598 A1* | 3/2011 | Gaur ................. | H04L 25/03057 375/233 |
| 2012/0093253 A1 | 4/2012 | Park et al. | |
| 2015/0222337 A1 | 8/2015 | Mielczarek et al. | |

OTHER PUBLICATIONS

Victor-Florin Crâmariu, Marius-Octavian Arvinte, Andrei-Alexandru Enescu, Silviu Ciochină, Member, IEEE, Waterfilling Power Allocation Applied in BlockDiagonalization Multi-User MIMO PrecodingTechnique (Year: 2016).*

* cited by examiner

*Primary Examiner* — Tanmay K Shah
(74) *Attorney, Agent, or Firm* — The Farrell Law Firm, P.C.

(57) ABSTRACT

Disclosed is an apparatus and a method of deriving an optimal precoder, in which a precoder is derived using water filling power allocation, and then is multiplied with some unitary matrix satisfying certain conditions to meet a per layer power constraint. Since the multiplication with the unitary matrix does not change the capacity, the derived precoder is optimal in achieving maximum capacity in a multiple input multiple output (MIMO) wireless communication scheme.

18 Claims, 4 Drawing Sheets

OPTIMAL PRECODER METHOD AND APPARATUS WITH EQUAL POWER ALLOCATION

PRIORITY

This application is based on and claims priority under 35 U.S.C. § 119(e) to U.S. Provisional Application Ser. No. 63/052,205, which was filed in the U.S. Patent and Trademark Office on Jul. 15, 2020, the contents of which are incorporated herein by reference.

BACKGROUND

1. Field

The disclosure relates generally to a precoder, and more particularly, to an apparatus and a method of deriving an optimal precoder that achieves the same capacity when water filling power allocation is performed and ensures equal power allocation per transmission layer.

2. Description of Related Art

Precoding is a technique that involves beamforming and determining the transmit power, or power allocation, for multiple antennas in a multiple input multiple output (MIMO) scheme for wireless communication.

Given a channel matrix $H \in \mathbb{C}^{N_R \times N_T}$, where $N_T \geq N_R$, or the number of transmit antennas $N_T$ is greater than or equal to the number of receive antennas $N_R$, it is necessary in the art to find a precoding matrix for H that achieves the maximum capacity for data transmission by allocating the identical amount of power to each layer. However, the prior art is devoid of such a precoding matrix H in the fifth generation (5G) new radio (NR) technology. Instead, the prior art performs power allocation under a total power constraint.

That is, in 5G NR systems, the base station (BS) chooses the precoding vector for different layers according to UE feedback. Since UE feedback, in general, does not provide information on allocated power for each layer, the BS often does not perform power allocation, or equivalently allocate the same power for each layer.

As such, there is a need in the art for an optimal precoder, and a method thereof, that provides equal power allocation per layer while maximizing capacity in 5G NR wireless communication.

SUMMARY

The present disclosure has been made to address at least the above-mentioned problems and/or disadvantages and to provide at least the advantages described below.

Accordingly, an aspect of the present disclosure is to provide an optimal precoder for a given channel by allocating the identical amount of power greater than zero to all layers in a 5G NR MIMO scheme.

Another aspect of the present disclosure is to provide an optimal precoder by allocating the identical amount of power greater than zero to a plurality of layers less than the entire amount of layers, and zero power to the remaining amount of layers.

Another aspect of the present disclosure is to select true singular vectors, in addition to the precoder, to maximize capacity.

In accordance with an aspect of the present disclosure, to achieve the optimal capacity, a method of deriving an optimal precoder includes inputting a channel matrix, calculating a singular value decomposition of the channel matrix, calculating a water-filling precoder by using the singular value decomposition of the channel matrix, and deriving the optimal precoder with equal power allocation.

In accordance with another aspect of the disclosure, an electronic device includes a memory, and a processor, wherein the processor is configured to derive an optimal precoder by inputting a channel matrix, calculating a singular value decomposition of the channel matrix, calculating a water-filling precoder by using the singular value decomposition of the channel matrix and deriving the optimal precoder with equal power allocation.

In accordance with another aspect of the disclosure, an electronic device includes a processor, and a non-transitory computer readable storage medium storing instructions that, when executed, cause the processor to input a channel matrix, calculate a singular value decomposition of the channel matrix, calculate a water-filling precoder by using the singular value decomposition of the channel matrix, and derive the optimal precoder with equal power allocation.

In accordance with another aspect of the disclosure, a base station (BS) includes a processor, and a non-transitory computer readable storage medium storing instructions that, when executed, cause the processor to input a channel matrix, calculate a singular value decomposition of the channel matrix, calculate a water-filling precoder by using the singular value decomposition of the channel matrix, and derive the optimal precoder with equal power allocation.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Embodiments of the present disclosure will be described herein below with reference to the accompanying drawings. However, the embodiments of the present invention are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the present invention, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present invention.

The disclosure sets forth the optimal precoder derived with equal power allocation when water filling power allocation is performed.

Figure 1:
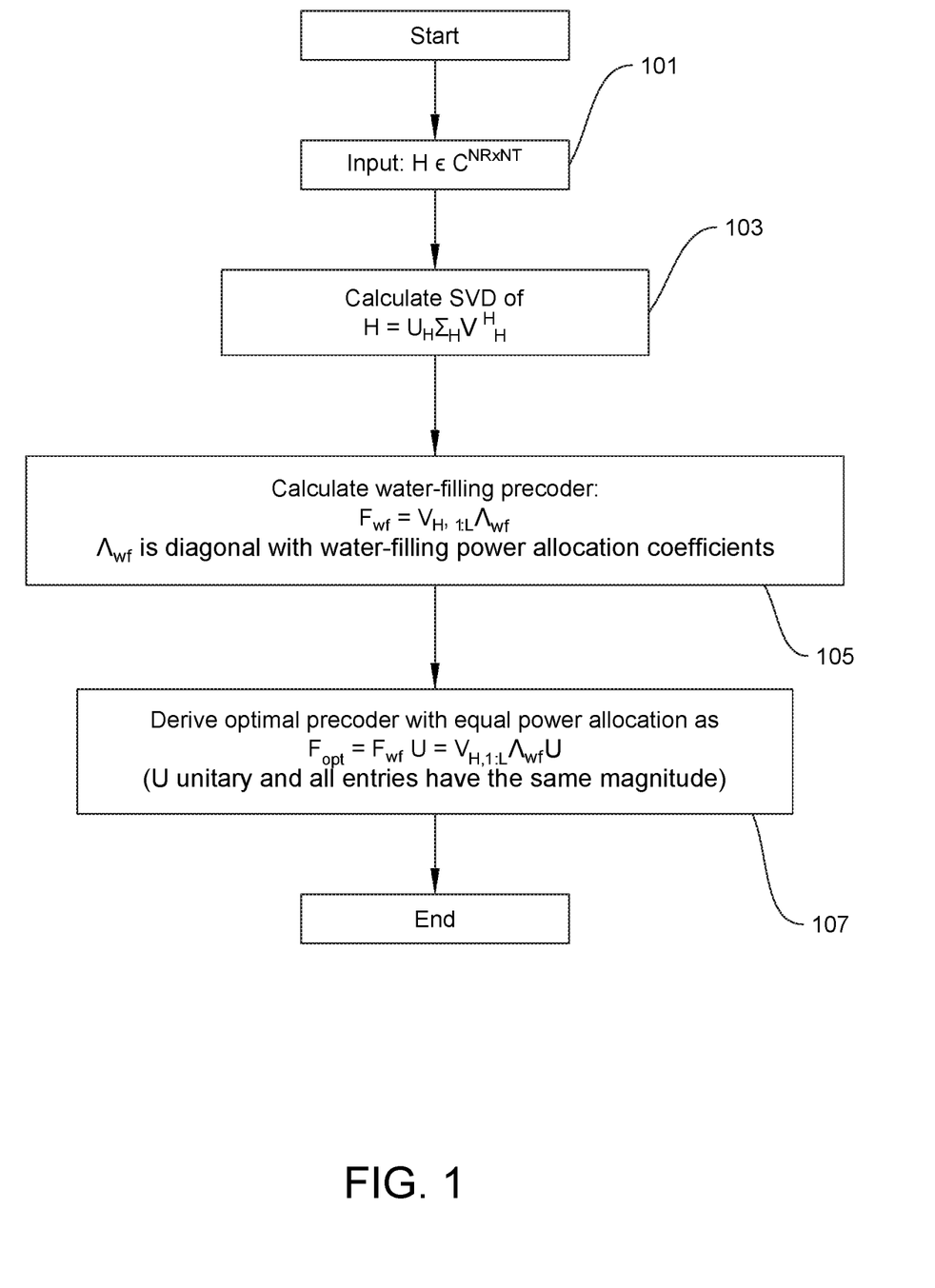
FIG. 1 illustrates a method of deriving an optimal precoder with equal power allocation according to an embodiment.

FIG. 1 illustrates a method of deriving an optimal precoder with equal power allocation according to an embodiment.

Broadly speaking in FIG. 1, the input is the channel matrix. Given the channel matrix, each of the channel singular value decomposition (SVD), the water-filling precoder, and the optimal precoder that satisfies the equal power constraint will be calculated.

In step 101, a channel matrix $H \in C^{N_R \times N_T}$ is input.

In detail, consider the following system model in Equation (1), as follows.

$$y = HFx + n \qquad (1)$$

In Equation (1), $H \in C^{N_R \times N_T}, F = [f_1, \ldots, f_L] \in C^{N_T \times N_R}$ and $x \in C_{L \times 1}, n \in C^{N_R \times 1}$, where H indicates a channel, L denotes number of transmission layers satisfying $L \leq N_R$, x indicates a channel input, and F indicates the precoder. Assume that $E[xx^H] = \rho I$ for some constant $\rho$. Gaussian noise n satisfying $E[nn^H] = \sigma^{-2} I$ and is uncorrelated with x. In the disclosure, it is assumed that $\sigma^2 = 1$, and $\rho$ denotes a signal-to-noise ratio (SNR).

Assuming that $N_T \geq N_R$ and that H has a full row rank, the total power constraint is given as $tr(E[Fxx^H F^H]) = tr(FF^H) \leq P$, where P is known. It is necessary to find F to maximize capacity I(x; y) subject to the total power constraint, i.e., shown in Equation (2), as follows.

$$\max_F I(x; y) = \log|I + \rho HFF^H H^H| \qquad (2)$$
$$s.t. \ tr(FF^H) \leq P$$

In step 103, the SVD of $H = U_H \Sigma_H V_H^H$ is calculated in order to obtain the MIMO channel capacity.

In detail, the true SVD of H is denoted in Equation (3) as follows.

$$H = U_H \Sigma_H V_H^H \qquad (3)$$

In Equation (3), $U_H \in C^{N_R \times N_R}$, $\Sigma_H \in C^{N_R \times N_R}$, and $V_H \in C^{N_T \times N_R}$, where V indicates the unitary matrix satisfying a constant magnitude, $V_H^H V_H = I$.

The factor $\Sigma_H$ is calculated in Equation (4), as follows.

$$\Sigma_H^2 = diag([\lambda_1, \ldots, \lambda_{N_R}]) \qquad (4)$$

In Equation (4), $\lambda_m$ denotes an eigenvalue of $HH^H$. I(x; y) can be written as shown in Equation (5), as follows.

$$I(x;y) = \log|I + \rho \Sigma_H V_H^H FF^H V_H \Sigma_H| \qquad (5)$$

Specifically, the optimal precoder to maximize Equation (5) is the water filling precoder, given by Equation (6) as follows.

$$F_{wf} = V_{H,1:L} \Lambda, \qquad (6)$$

In Equation (6), $V_{H,1:L} \in C^{N_T \times L}$ consists of right singular vectors of H corresponding to its top L eigenvalues, denoted by $\lambda_1, \ldots, \lambda_L$. $\Lambda \in C^{L \times L}$ is a diagonal matrix with diagonal elements denoting power allocated per layer, given by Equation (7) as follows.

$$\Lambda_{mm}^2 = \left(\mu - \frac{1}{\rho \lambda_m}\right)^+ = \begin{cases} \mu - \frac{1}{\rho \lambda_m} & \text{if } \mu - \frac{1}{\rho \lambda_m} > 0 \\ 0 & \text{otherwise} \end{cases} \qquad (7)$$

The constant $\mu$ is determined to satisfy the total power constraint in Equation (8), as follows.

$$\sum_{m=1}^{L} \Lambda_{mm}^2 = P \qquad (8)$$

In step 105, therefore, the optimal precoder is calculated with water filling (wf) power allocation in Equation (9) as follows.

$$F_{wf} = V_{H,L:l} \Lambda \qquad (9)$$

In step 107, the optimal precoder (opt) with equal power allocation is derived in Equation (10) as follows.

$$F_{opt} = F_{wf} U, \qquad (10)$$

In Equation (10), U is a unitary matrix satisfying the condition that all entries (i.e., each element in the matrix U) have the same amplitude.

In detail, the precoder matrix $F = [f_1, \ldots, f_{N_R}] \in C^{N_T \times N_R}$ is derived to achieve the optimal capacity for the case of equal power allocation. That is, it is assumed that $\|f_m\|^2 = c, \forall m$ and some constant c. For simplicity, assume that $c = 1$ in the following discussion.

If the constraint on precoding matrix F is posed such that $F^H F = I$, then choosing $F = V_H$ results in the optimal capacity because the diagonal terms of $\tilde{Q}$ are given by Equation (11), as follows.

$$\tilde{Q}_{mm} = \sum_{i=1}^{N_R} |v_m^H f_i|^2 \qquad (11)$$

If $F^H F = I$, $\tilde{Q}_{mm} \leq |v_m|^2 \leq 1$ with equality if $F = V_H$. According to Equation (5), choosing $F = V_H$ results in the optimal capacity if column vectors of F are forced to be mutually orthogonal.

However, if the column vectors of F are not forced to be mutually orthogonal, choosing $F=V_H$ does not necessarily result in the optimal capacity since $\tilde{Q}$ may no longer be diagonal and diagonal terms of $\tilde{Q}$ can be larger than 1. Equations (4)-(9) alone may not indicate which F results in the maximum capacity.

As shown below, under the constraint that $\|f_m\|^2=1$, $\forall m$, the desired precoding matrix to achieve optimal capacity can be constructed accordingly, given the optimal precoder with equal power allocation.

First, the constraint of $\|f_m\|^2=1$, $\forall m$, is relaxed to be $tr(FF^H) \leq N_R$. Under the total power constraint, the optimal precoder $F_{opt}$ can be derived according to Equation (11) using water filling power allocation. The following two points are of particular salience.

1. Under the equal power constraint, the optimal precoder will achieve capacity no larger than the water filling precoder, and
2. FU will achieve the same capacity as F, for any precoder F and unitary matrix U.

Points 1 and 2 reveal that, to show $F_{opt}$ is optimal, it is sufficient to show that the equal power constraint is satisfied.

In the following Equations (12)-(14), it will be shown that the per layer power constraint is met if $|U_{im}|=1/\sqrt{L}$ for any i and m. Note that discrete Fourier transform (DFT) and Hadamard matrices satisfy $|U_{im}|=1/\sqrt{L}$.

Equation (12) appears as follows.

$$F_{opt}F_{wf}U=V_{H,1:L}\Lambda U \qquad (12)$$

To arrive at per layer power, it is sufficient to determine the diagonal terms of $F_{opt}^H F_{opt}$ in Equation (13), as follows.

$$F_{opt}^H F_{opt}=U^H \Lambda^2 U \qquad (13)$$

Specifically, the diagonal terms are calculated in Equation (14), as follows.

$$(F_{opt}^H F_{opt})_{mm} = \sum_{i=1}^{L} \Lambda_{ii}^2 |U_{im}|^2 \qquad (14)$$

From Equation (14), it is verifiable that, if $|U_{im}|=1/\sqrt{L}$, $(F_{opt}F_{opt})_{mm}=1/L\Sigma_{i=1}^{L}\Lambda_{ii}^2$, $\forall m=1,\ldots,L$.

As seen above, to achieve equal power allocation, the optimal precoder can be derived as follows: In step 105, the water filling precoder $F_{wf}$ is derived using water filling power allocation, and in step 107, the optimal precoder is derived by multiplying the water filling precoder by a unitary matrix U satisfying $|U_{im}|=1/\sqrt{L}$, such as the DFT matrix, to meet the equal power per layer constraint.

Since being multiplied by the unitary matrix U does not affect the capacity, the derived precoder $F_{opt}$ in Equation (12) is optimal and achieves the largest capacity for the case of equal power allocation.

Herein, any orthogonal precoders under different power allocation strategies can be transformed by the unitary matrix U with constant entry to meet the equal power per layer constraint.

Figure 2:
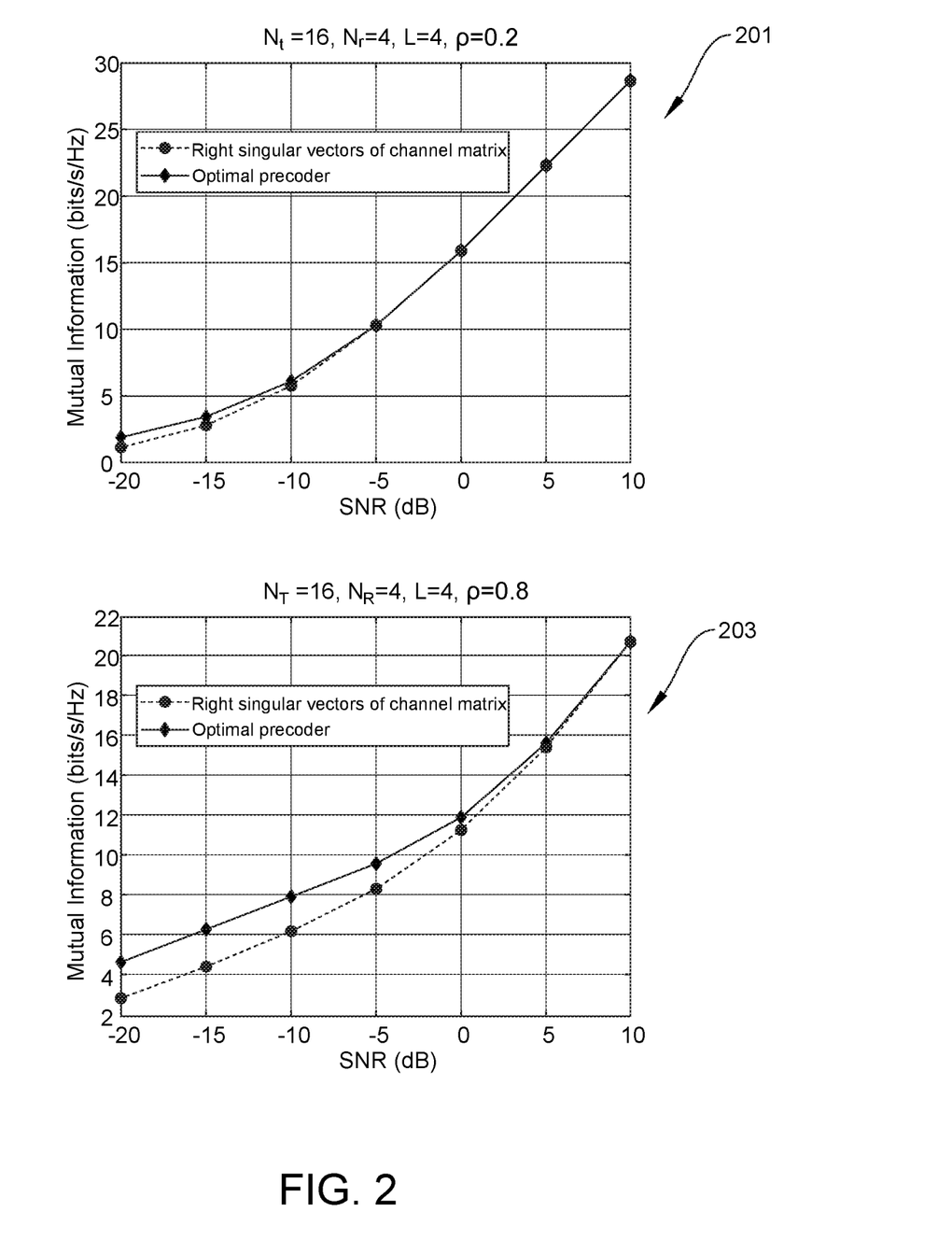
FIG. 2 illustrates the capacity results as realized by the optimal precoder according to an embodiment.

FIG. 2 illustrates the capacity results as realized by the optimal precoder according to an embodiment.

Graphs 201 and 203 are illustrated in FIG. 2. Specifically, both graphs 201 and 203 illustrate mutual information of bits/s/Hz (Hertz) vs. SNR (expressed by decibel (dB)) in a right singular vector of channel matrix curve in the conventional art represented by a dotted line, and the optimal precoder curve of the present disclosure represented by a solid line.

In graph 201, $N_t=16$, $N_r=4$, $L=4$, and $\rho=0.2$. The same constants apply in graph 203 save for SNR constant $\rho$ in graph 203, where $\rho=0.8$. In either instance, a capacity gain of the optimal precoder in the present application over the right singular vectors in the conventional art is observed at a very low SNR.

Figure 3:
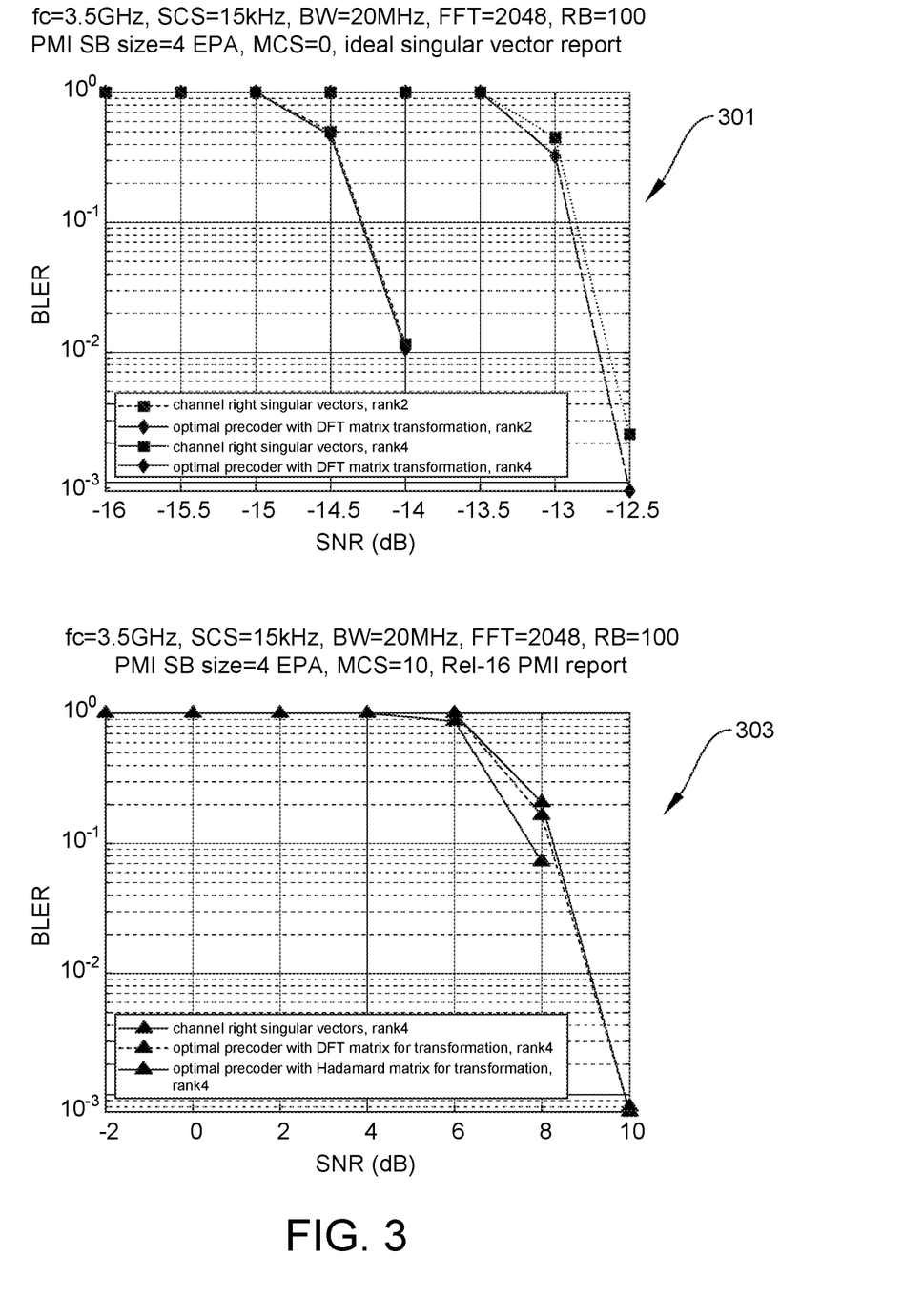
FIG. 3 illustrates the block error rate (BLER) results as realized by the optimal precoder according to an embodiment.

FIG. 3 illustrates the BLER results as realized by the optimal precoder according to an embodiment.

Graphs 301 and 303 are illustrated in FIG. 3. Specifically, these graphs correspond to different ranks, as graph 301 is for rank 2 communication and graph 303 is for rank 4 communication.

Both graphs 301 and 303 illustrate BLER vs. SNR, and are realized when fc=3.5 gigahertz (GHz), singular vectors (SCs)=15 kilohertz (kHz), bandwidth (BW)=20 megahertz (MHz), fast Fourier transform (FFT)=2048, resource block (RB)=100, precoding matrix indicator subband (PMI SB) size=4, extended pedestrian a model (EPA) and modulation-coding scheme (MCS)=0.

The BLER is derived from the acknowledged/non-acknowledged (ACK/NACK) message from the packet of the radio link control (RLC) layer and refers to the ratio of the number of NACK blocks to the total number of ACK blocks by the mobile station.

As shown, graph 301 reflects the ideal singular vector report, as compared to graph 303 which reflects the release 16 (Rel-16) PMI report. In graph 301, four curves are provided, including the optimal precoder with DFT matrix transformation (rank 2) curve of the present disclosure represented in a solid line, and channel right singular vectors (rank 2) of the conventional art, channel right singular vectors (rank 4) of the conventional art, and optimal precoder with DFT matrix transformation (rank 4) curves of the present disclosure represented in differing dotted lines.

An improved BLER vs. SNR is realized in the ideal singular vector report 301 as compared to that provided in graph 303 where the curves reveal the BLER at a higher SNR level than in the ideal singular vector report shown in graph 301. That is, for the ideal singular vectors report in graph 301, the optimal precoder shows gain over the right singular rectors at a very low SNR as compared to the PMI report in Rel-16 in graph 303, where a loss is revealed over the right singular vectors in the performance of the optimal precoders. That is, the derived optimal precoder can be applied to 5G PMI selection, even though loss is sometime observed in terms of BLER. However, no loss can be observed in terms of capacity.

The disclosed precoder can be used as the first step of deriving PMI for LTE and 5G NR systems. That is, the first step of type II PMI selection is to identify the beams. The disclosed optimal precoder can be applied to any codebook-based precoding scheme, such as PMI selection in 5G NR systems. The derived optimal precoder can be applied to beam identification of type two precoding matrix indicator selection in 5G NR systems. That is, the optimal precoder can be applied to any codebook-based precoding scheme, such as type II PMI selection.

If necessary, the complexity of calculating the actual SVD of H could be decreased by using low complexity algorithms to approximate SVD of H. Based on the approximated SVD, the optimal precoder can be constructed accordingly.

Figure 4:
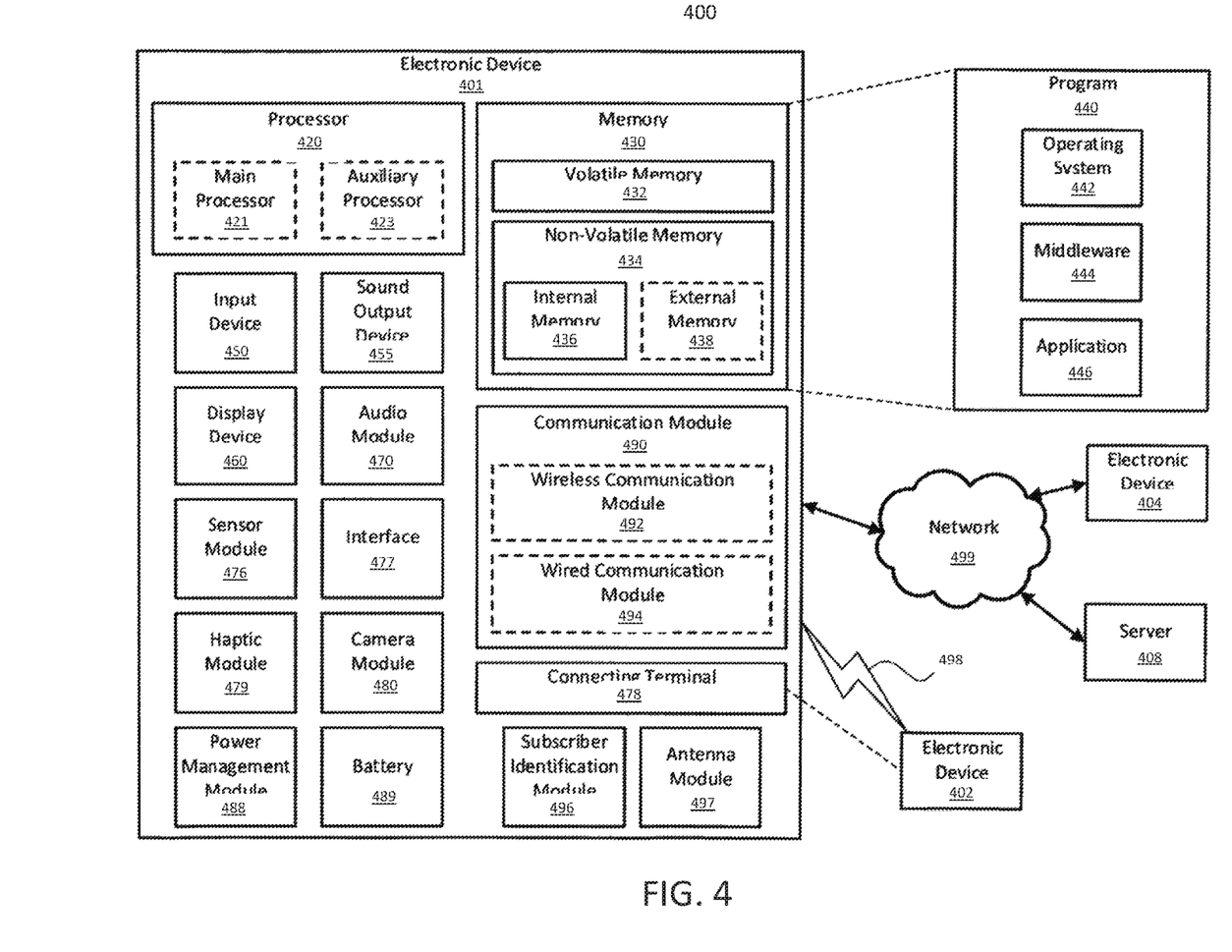
FIG. 4 is a block diagram of an electronic device in a network environment, according to an embodiment.

FIG. 4 is a block diagram of an electronic device in a network environment, according to one embodiment. Referring to FIG. 4, an electronic device 401 in a network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In one embodiment, at least one (e.g., the display device 460 or the camera module 480) of the components may be omitted from the electronic device 401, or one or more other components may be added to the electronic device 401. Some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420, and may perform various data processing or computations. As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). The auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by another component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. The display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. The audio module 470 may obtain the sound via the input device 450, or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. The interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. The connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. The haptic module 479 may include, for example, a motor, a piezoelectric element, or an electrical stimulator.

The camera module 480 may capture a still image or moving images. The camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. The battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. The communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. The antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome; as at least part of a reply to the request. To that end, a cloud computing, distributed computing, or client-server computing technology may be used, for example.

The embodiments of the present disclosure can also be embodied as computer-readable codes on a computer-readable recording medium, which may be non-transitory. The computer-readable recording medium is any data storage device that can store data that can thereafter be read by a computer system. Examples of the computer-readable recording medium include, but are not limited to, read-only memory (ROM), random-access memory (RAM), CD-ROMs, magnetic tapes, floppy disks, optical data storage devices. The computer-readable recording medium can also be distributed over network-coupled computer systems so that the computer-readable code is stored and executed in a distributed fashion. Also, function programs, codes, and code segments for accomplishing the present disclosure can be easily construed as within the scope of the disclosure by programmers skilled in the art to which the present disclosure pertains.

While the present disclosure has been described with reference to various embodiments, various changes may be made without departing from the spirit and the scope of the present invention, which is defined, not by the detailed description and embodiments, but by the appended claims and their equivalents.

What is claimed is:

1. A method of deriving an optimal precoder in a wireless communication system, comprising:
    inputting a channel matrix;
    calculating a singular value decomposition of the channel matrix;
    calculating a water-filling precoder by using the singular value decomposition of the channel matrix; and
    deriving the optimal precoder with equal power allocation,
    wherein the optimal precoder is derived by transforming the calculated water-filling precoder by a unitary matrix with constant magnitude for each element of the unitary matrix.

2. The method of claim 1,
    wherein the water-filling precoder is calculated by using a water-filling power allocation scheme.

3. The method of claim 1,
    wherein the equal power allocation is an identical magnitude of power allocated for each layer in a multiple input multiple output communication scheme.

4. The method of claim 3,
    wherein the magnitude of the power is greater than zero.

5. The method of claim 1,
    wherein the equal power allocation is an identical amount of power allocated for a plurality of layers less than an entirety of the layers, and
    wherein remaining layers of the entirety of the layers are allocated with zero power.

6. An electronic device, comprising:
    a memory; and
    a processor,
    wherein the processor is configured to derive an optimal precoder by:

inputting a channel matrix,
calculating a singular value decomposition of the channel matrix,
calculating a water-filling precoder by using the singular value decomposition of the channel matrix, and
deriving the optimal precoder with equal power allocation, and
wherein the optimal precoder is derived by transforming the calculated water-filling precoder by a unitary matrix with constant magnitude for each element of the unitary matrix.

7. The electronic device of claim 6,
wherein the water-filling precoder is calculated by using a water-filling power allocation scheme.

8. The electronic device of claim 6,
wherein the equal power allocation is an identical magnitude of power allocated for each layer in a multiple input multiple output communication scheme.

9. The electronic device of claim 8,
wherein the magnitude of the power is greater than zero.

10. The electronic device of claim 6,
wherein the equal power allocation is an identical amount of power allocated for a plurality of layers less than an entirety of the layers, and
wherein remaining layers of the entirety of the layers are allocated with zero power.

11. An electronic device, comprising:
a processor; and
a non-transitory computer readable storage medium storing instructions that, when executed, cause the processor to:
input a channel matrix;
calculate a singular value decomposition of the channel matrix;
calculate a water-filling precoder by using the singular value decomposition of the channel matrix; and
derive an optimal precoder with equal power allocation,
wherein the optimal precoder is derived by transforming the calculated water-filling precoder by a unitary matrix with constant magnitude for each element of the unitary matrix.

12. The electronic device of claim 11,
wherein the instructions, when executed, further cause the processor to transform orthogonal precoders having different power allocation strategies by a unitary matrix with constant magnitude among all entries in the unitary matrix to achieve the equal power allocation.

13. The electronic device of claim 11,
wherein the instructions, when executed, further cause the processor to apply the derived optimal precoder to any codebook based precoding scheme, including type two precoding matrix indicator selection in fifth generation new radio systems.

14. The electronic device of claim 11,
wherein the water-filling precoder is calculated by using a water-filling power allocation scheme.

15. A base station, comprising:
a processor; and
a non-transitory computer readable storage medium storing instructions that, when executed, cause the processor to:
input a channel matrix;
calculate a singular value decomposition of the channel matrix;
calculate a water-filling precoder by using the singular value decomposition of the channel matrix; and
derive an optimal precoder with equal power allocation,
wherein the optimal precoder is derived by transforming the calculated water-filling precoder by a unitary matrix with constant magnitude for each element of the unitary matrix.

16. The base station of claim 15,
wherein the instructions, when executed, further cause the processor to transform orthogonal precoders having different power allocation strategies by a unitary matrix with constant magnitude among each element of the unitary matrix to achieve the equal power allocation.

17. The base station of claim 15,
wherein the instructions, when executed, further cause the processor to apply the derived optimal precoder to any codebook based precoding scheme, including type two precoding matrix indicator selection in fifth generation new radio systems.

18. The base station of claim 15,
wherein the water-filling precoder is calculated by using a water-filling power allocation scheme.

* * * * *